US012217555B2

(12) United States Patent
Sakurai et al.

(10) Patent No.: US 12,217,555 B2
(45) Date of Patent: Feb. 4, 2025

(54) CENTER DEVICE, DATA COMMUNICATION SYSTEM, AND PROGRAM PRODUCT FOR CONTROLLING DATA DISTRIBUTION

(71) Applicant: DENSO CORPORATION, Kariya (JP)

(72) Inventors: Nao Sakurai, Kariya (JP); Yoshitaka Ozaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 397 days.

(21) Appl. No.: 17/477,998

(22) Filed: Sep. 17, 2021

(65) Prior Publication Data

US 2022/0005292 A1 Jan. 6, 2022

Related U.S. Application Data

(63) Continuation of application No. PCT/JP2020/010034, filed on Mar. 9, 2020.

(30) Foreign Application Priority Data

Mar. 22, 2019 (JP) ................. 2019-054791

(51) Int. Cl.
  *G07C 5/00* (2006.01)
  *G08G 1/01* (2006.01)
  *H04L 67/12* (2022.01)
(52) U.S. Cl.
  CPC .......... *G07C 5/008* (2013.01); *G08G 1/0125* (2013.01); *H04L 67/12* (2013.01)

(58) Field of Classification Search
  CPC ...... G07C 5/008; G08G 1/0125; H04L 67/12; H04L 67/34; H04L 67/535; G06F 8/60; H04W 4/44; H04W 4/50
  See application file for complete search history.

(56) References Cited

U.S. PATENT DOCUMENTS

| 2004/0198254 | A1* | 10/2004 | Mizui | .................. G08G 1/20 455/66.1 |
| 2009/0201380 | A1* | 8/2009 | Peaslee | ................. H04N 19/51 348/208.4 |
| 2009/0276106 | A1* | 11/2009 | Doan | .................. G06F 11/3696 701/3 |
| 2011/0083128 | A1* | 4/2011 | Hoch | ....................... G06F 8/61 717/174 |
| 2014/0282470 | A1* | 9/2014 | Buga | ........................ G06F 8/65 717/170 |

(Continued)

FOREIGN PATENT DOCUMENTS

| EP | 3301565 A1 | 4/2018 |
| JP | 2010191786 A | 9/2010 |

(Continued)

*Primary Examiner* — Sohana Tanju Khayer
(74) *Attorney, Agent, or Firm* — Harness, Dickey & Pierce, P.L.C.

(57) ABSTRACT

A center device includes a distribution control unit that is configured to control distribution of data to a vehicle, a normal operation determination unit that is configured to determine whether operation of distributed data on a vehicle is normal, and a distribution target expansion unit that is configured to expand a distribution target for the data when the normal operation determination unit determines that operation of the distributed data on the vehicle is normal after the data was distributed to the vehicle.

3 Claims, 15 Drawing Sheets

(56) References Cited

U.S. PATENT DOCUMENTS

| | | | | |
|---|---|---|---|---|
| 2014/0365067 | A1* | 12/2014 | Kwon | G07C 5/0808 |
| | | | | 701/31.5 |
| 2016/0003621 | A1* | 1/2016 | Koenig | G01C 21/20 |
| 2016/0012795 | A1* | 1/2016 | Banski | G09G 5/395 |
| | | | | 345/520 |
| 2016/0225003 | A1* | 8/2016 | Inman | G06Q 30/0205 |
| 2017/0031675 | A1 | 2/2017 | Oshima | |
| 2018/0067737 | A1* | 3/2018 | Zakharov | H04L 67/10 |
| 2018/0074811 | A1 | 3/2018 | Kiyama et al. | |
| 2018/0095745 | A1* | 4/2018 | Mine | G06F 11/3664 |
| 2018/0102003 | A1 | 4/2018 | Nakai | |
| 2018/0321929 | A1* | 11/2018 | Persson | H04L 63/123 |
| 2019/0028904 | A1* | 1/2019 | Carpenter | G08G 5/0082 |
| 2019/0034193 | A1* | 1/2019 | Fox | B60W 50/04 |
| 2019/0155594 | A1* | 5/2019 | Nakaguma | G06F 9/445 |
| 2019/0163466 | A1* | 5/2019 | Kiyama | H04W 4/44 |
| 2019/0261176 | A1 | 8/2019 | Yamazaki et al. | |
| 2020/0042306 | A1* | 2/2020 | Kiyama | G06F 11/327 |
| 2020/0053112 | A1* | 2/2020 | Torisaki | H04L 67/12 |
| 2020/0125354 | A1* | 4/2020 | Kim | G06F 11/0754 |
| 2020/0218623 | A1* | 7/2020 | Zhang | G06F 8/60 |

FOREIGN PATENT DOCUMENTS

| | | |
|---|---|---|
| JP | 2011148398 A | 8/2011 |
| JP | 2017033147 A | 2/2017 |
| JP | 2018045515 A | 3/2018 |
| JP | 2018055645 A | 4/2018 |
| JP | 2018086894 A | 6/2018 |
| WO | WO-2018070242 A1 | 4/2018 |

\* cited by examiner

FIG. 4

| VEHICLE | 10:00-17:00 AVERAGE PARKING TIME (TIME) | TEMP CHANGE RANGE (°C) | DISTANCE FROM DEALER (km) |
|---|---|---|---|
| VEHICLE A | 5 | 5 TO 13 | 0.5 |
| VEHICLE B | 7 | 3 TO 10 | 1 |
| VEHICLE C | 6 | 7 TO 16 | 0.3 |
| VEHICLE D | 5 | 6 TO 15 | 10 |
| VEHICLE E | 3 | -15 TO -2 | 2 |
| VEHICLE F | 4 | 3 TO 11 | 15 |
| VEHICLE G | 3 | -25 TO -10 | 20 |
| VEHICLE H | 4 | 18 TO 27 | 30 |
| VEHICLE I | 4 | 4 TO 13 | 60 |

FIG. 5

| VEHICLE | GROUP |
|---|---|
| VEHICLE A | GROUP A |
| VEHICLE B | GROUP A |
| VEHICLE C | GROUP A |
| VEHICLE D | GROUP B |
| VEHICLE E | GROUP B |
| VEHICLE F | GROUP B |
| VEHICLE G | GROUP C |
| VEHICLE H | GROUP C |
| VEHICLE I | GROUP C |

FIG. 6

| GROUP | NUMBER OF TARGET VEHICLES | DISTRIBUTION TIMING |
|---|---|---|
| GROUP A | 100 | M1/D1 |
| GROUP B | 900 | M2/D2 |
| GROUP C | 9000 | M3/D3 |

FIG. 9

| LOGICAL UNIT | DATA CAPACITY |
|---|---|
| LOGICAL UNIT | 10kB |
| LOGICAL UNIT | 1MB |
| LOGICAL UNIT | 10MB |

FIG. 10

| DATA CAPACITY | DISTRIBUTION TIMING |
|---|---|
| 10kB | M1/D1 |
| 1MB | M2/D2 |
| 10MB | M3/D3 |

FIG. 13

| FUNCTION/PERFORMANCE |
|---|
| AUTO-BRAKING |
| AUTO-STEERING |
| AUTO-ACCELERATION |

FIG. 14

| FUNCTION/PERFORMANCE | MODE | DISTRIBUTION TIMING |
|---|---|---|
| AUTO-BRAKING: ON<br>AUTO-STEERING: OFF<br>AUTO-ACCELERATION: OFF | MODE 1 | M1/D1 |
| AUTO-BRAKING: ON<br>AUTO-STEERING: ON<br>AUTO-ACCELERATION: OFF | MODE 2 | M2/D2 |
| AUTO-BRAKING: ON<br>AUTO-STEERING: ON<br>AUTO-ACCELERATION: OFN | MODE 3 | M3/D3 |

CENTER DEVICE, DATA COMMUNICATION SYSTEM, AND PROGRAM PRODUCT FOR CONTROLLING DATA DISTRIBUTION

This application is a continuation application of International Patent Application No. PCT/JP2020/010034 filed on Mar. 9, 2020, which designated the U.S. and claims the benefit of priority from Japanese Patent Application No. 2019-054791 filed on Mar. 22, 2019. The entire disclosure of all of the above application is incorporated herein by reference.

TECHNICAL FIELD

The present disclosure relates to a center device, a data communication system, and a program product for controlling data distribution.

BACKGROUND ART

In recent years, along with development of communication network technology, connected-cars related technology is developing as well. Taking advantage of the technology of connected cars, a system where a center device wirelessly distributes data to vehicles has been provided. For example, there has been known a system where a center device wirelessly distributes reprogramming data to vehicles to update an application program of an in-vehicle electronic control unit (hereinafter, referred to as ECU (Electronic Control Unit)).

SUMMARY

According to one aspect of the present disclosure, a distribution control unit is configured to control distribution of data to a vehicle. A normal operation determination unit is configured to determine whether operation of distributed data on a vehicle is normal. A distribution target expansion unit is configured to expand a distribution target for the data when the normal operation determination unit determines that operation of the distributed data on the vehicle is normal after the data was distributed to the vehicle.

BRIEF DESCRIPTION OF DRAWINGS

The above and other objects, features and advantages of the present disclosure will become more apparent from the following detailed description made with reference to the accompanying drawings. In the drawings:

FIG. 4 is a diagram showing vehicle information and external information;

FIG. 5 is a diagram showing groups;

FIG. 6 is a diagram showing a distribution plan for expanding a distribution target for modified reprogramming data;

FIG. 9 is a diagram showing logical units and data capacities of the modified reprogramming data;

FIG. 10 is a diagram showing a distribution plan for increasing a distribution amount for the modified reprogramming data;

FIG. 13 is a diagram showing functions and performance of the modified reprogramming data;

FIG. 14 is a diagram showing a distribution plan for expanding functions and performance of the modified reprogramming data that was distributed;

DESCRIPTION OF EMBODIMENTS

To begin with, a relevant technology will be described first only for understanding the following embodiments. In a configuration in which the center device distributes data to a vehicle, an unexpected event may occur due to surrounding factors or the like even if there is no quality defect or issue in the distributed data. If an unexpected event occurs in the distributed data, a huge burden would be required to reduce the impact of damage. Therefore, at the center device, it is desired to reduce the influence associated with the distributed data.

The objective of the present disclosure is to appropriately reduce the influence associated with the distributed data.

As described above, according to one aspect of the present disclosure, a distribution control unit is configured to control distribution of data to a vehicle. A normal operation determination unit is configured to determine whether operation of distributed data on a vehicle is normal. A distribution target expansion unit is configured to expand a distribution target for the data when the normal operation determination unit determines that operation of the distributed data on the vehicle is normal after the data was distributed to the vehicle.

Data is distributed to a vehicle, and if the operation of the distributed data on the vehicle is determined to be normal, the distribution target for the data is expanded. By expanding the distribution target for the data after confirming that the operation of the distributed data on the vehicle is normal, the range of influence associated with the distributed data can be appropriately decreased.

Hereinafter, an embodiment of the present disclosure will be described with reference to the drawings. A data distribution system is a system where a center device wirelessly distributes data to vehicles. In the present embodiment, as data distributed from the center device to the vehicle side, for example, reprogramming data for updating an application program for an in-vehicle ECU that is used for vehicle control or vehicle diagnosis, for example. The reprograming data includes software necessary for hardware (a physical machine) of the ECU to control the operation of the ECU by executing the application program.

Figure 1:
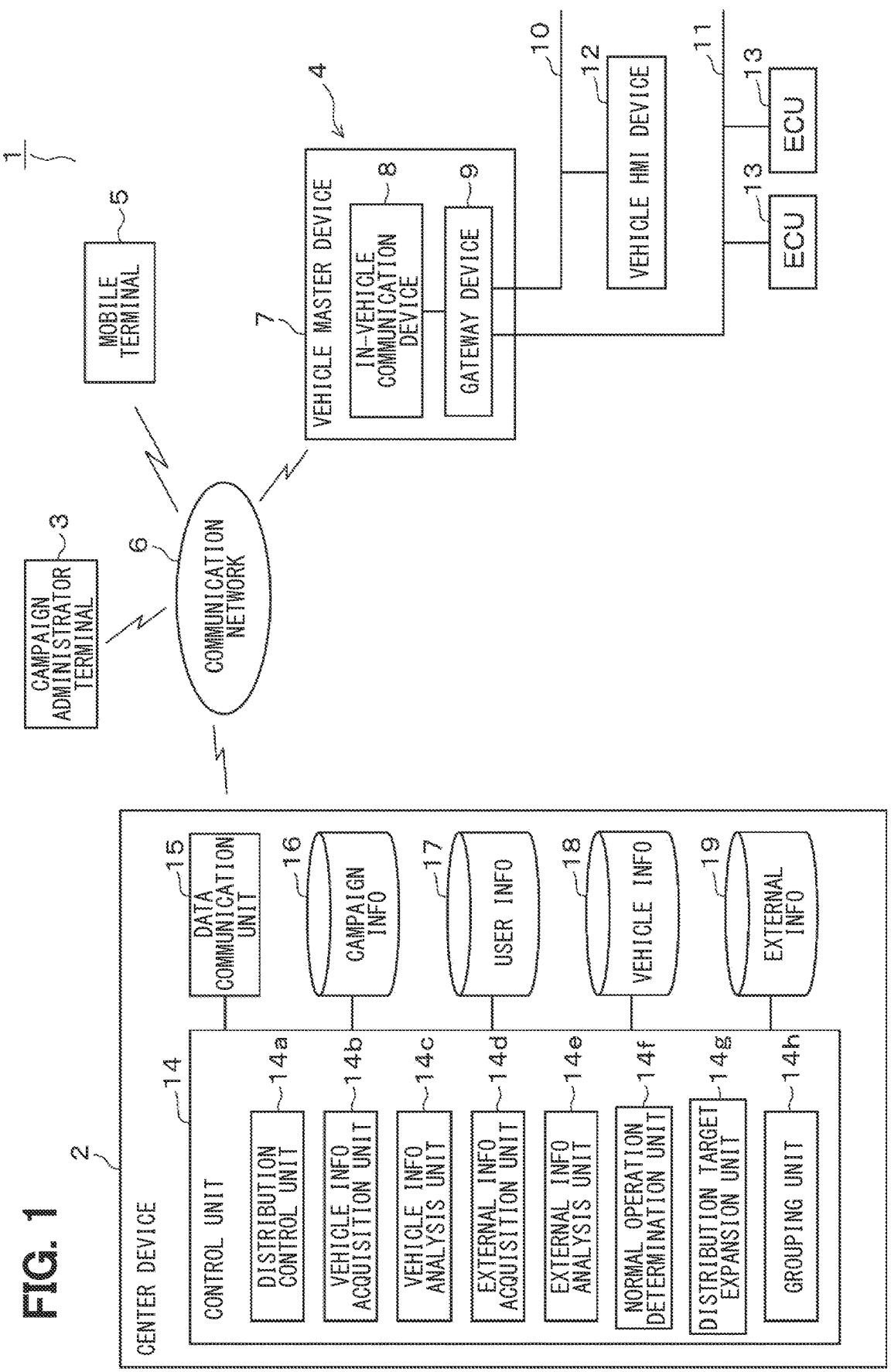
FIG. 1 is a diagram showing a configuration according to an embodiment of the present disclosure.

As shown in FIG. 1, the data distribution system 1 includes a center device 2 that distributes reprograming data to vehicles, a campaign administrator terminal 3 managed by a campaign administrator that provides the reprograming data to the center device 2, a vehicle-side system 4 mounted in the vehicle, and a mobile terminal 5 carried by a user. The mobile terminal 5 may be a smartphone or a tablet having a web browser. The center device 2, the campaign administrator terminal 3, the vehicle-side system 4, and the mobile terminal 5 are configured to communicate with each other via a communication network 6. The communication network 6 may be a public communication network including a communication network compliant with LPWA (Low Power Wide Area) communication method and a communication network compliant with LTE (Long Term Evolution) communication method. The center device 2 forms a one-to-many relationship with the vehicle-side systems 4 and the mobile terminals 5. That is, the center device 2 is configured to communicate with, and distribute reprograming data to, an unspecified number of vehicle-side systems 4 and an unspecified number of mobile terminals 5.

The campaign administrator terminal 3 administrates the reprograming data distributed from the center device 2 to the vehicles. The campaign administrator terminal 3 transmits campaign information to the center device 2 when a reprograming data distribution event is established such as an event to improve functions or to repair a bug.

When the center device 2 receives the campaign information from the campaign manager terminal 3, the center device 2 distributes a campaign notification to the vehicle-side system 4 and the mobile terminal 5. The campaign notification is a notification that notifies the vehicle-side system 4 and the mobile terminal 5 of distribution of reprograming data.

The vehicle-side system 4 has a vehicle master device 7. The vehicle master device 7 has an in-vehicle communication device 8 and a gateway device 9, and the in-vehicle communication device 8 and the gateway device 9 are connected to communicate data with each other. The in-vehicle communication device 8 performs data communication with the center device 2 via the communication network 6. When the in-vehicle communication device 8 downloads reprogramming data from the center device 2, the in-vehicle communication device 8 transfers the downloaded reprogramming data to the gateway device 9.

A vehicle HMI (Human Machine Interface) device 12 is connected to the gateway device 9 via a bus 10, and various types of ECUs 13 are connected to the gateway device 9 via a bus 11. The vehicle HMI device 12 has an HMI function and also has a function of displaying various screen images and a function of accepting user operations. The bus 11 is, for example, a bus for a traveling system network, and an ECU that controls the traveling system is connected to the bus 11. The ECU that controls the traveling system may include, for example, an accelerator ECU that controls operations of an accelerator, a brake ECU that controls operations of a brake, a steering ECU that controls operations of a steering, an autonomous driving ECU that controls an autonomous driving function, and the like. The bus 11 may be, for example, a body system network bus, a multimedia system network bus, or the like, other than the traveling system network bus, and an ECU that controls the body system or an ECU that controls the multimedia system may be connected to the bus 11. The type and number of buses 11 and the type and number of ECUs 13 are not limited to the configuration as illustrated.

The gateway device 9 has a data relay function, and when reprogramming data is transferred from the in-vehicle communication device 8, the transferred reprogramming data is distributed to the ECU 13 that is designated as a distribution target. When the ECU 13 receives the reprogramming data from the gateway device 9, the ECU 13 writes the received reprogramming data to a flash memory. By writing the reprogramming data to the flash memory, the ECU 13 updates a application program to improve the function of the application program and fix a bug.

In the above-described configuration, when the mobile terminal 5 and the vehicle HMI device 12 receive the campaign notification from the center device 2, a campaign notification screen image is displayed to notify the user of campaign information that notifies the user that the reprogramming data can be downloaded from the center device 2. When the campaign notification screen image is displayed on the mobile terminal 5 or the vehicle HMI device 12, the user confirms the procedure for updating the application program through various screens, and can start updating the application program by inputting or selecting necessary items. That is, the user can update the application program by properly using the mobile terminal 5 at an outside of the vehicle or the vehicle HMI device 12 at an inside of the vehicle. That is, the user can update the application program through the vehicle HMI device 12 in the vehicle. On the contrary, if the user is not riding in the vehicle but holds a mobile terminal 5, the user can update the application program through the mobile terminal 5. If an urgent update for the application program is required, reprogramming data may be downloaded from the center device 2 without displaying the campaign notification screen image and without the user taking the procedure for updating the application program.

The center device 2 includes a control unit 14, a data communication unit 15, a campaign information storage unit 16, a user information storage unit 17, a vehicle information storage unit 18, and an external information storage unit 19. In the present embodiment, these storage units 16 to 19 are illustrated as provided in the center device 2. However, these storage units 16 to 19 may be provided in an external server that is different from the center device 2 and the center device 2 and the external server may communicate data with each other.

The data communication unit 15 performs data communication with the campaign administrator terminal 3, the vehicle side system 4, and the mobile terminal 5 via the communication network 6. The campaign information storage unit 16 stores various information related to reprogramming data for a distribution target as campaign information, and also stores the reprogramming data. The campaign information includes a distribution destination, a data distribution amount, a type of reprogramming data, and the like, and is stored in the campaign information storage unit 16 after transmitted from the campaign manager terminal 3 to the center device 2. The reprogramming data is stored in the campaign information storage unit 16 after transmitted from the campaign manager terminal 3 to the center device 2.

The user information storage unit 17 stores, as user information, various information about an owner who owns the vehicle. The user information includes a vehicle identification number (hereinafter, referred to as VIN (Vehicle Identification Number)) uniquely assigned to each vehicle, a telephone number of the in-vehicle communication device 8 mounted in the vehicle, and a telephone number of the mobile terminal 5 owned by the user. The user information is stored in the user information storage unit 17 when, for example, the user performs an input operation through the vehicle HMI device 12 at the time of, for example, purchasing the vehicle and the input user information is transmitted from the vehicle master device 7 to the center device 2.

The vehicle information storage unit 18 stores various information about the vehicle as vehicle information. The vehicle information includes log information indicating a vehicle log and position information indicating a vehicle position. The vehicle log is, for example, a time of turning on the engine, a time of turning off the engine, an accelerator operation time and its operation amount, a brake operation time and its operation amount, a steering operation time and its operation amount, and the like. The vehicle information is stored in the vehicle information storage unit 18 when transmitted from the vehicle master device 7 to the center device 2.

The external information storage unit 19 stores various information acquired from an outside of the vehicle as external information. The external information includes, for example, map information, weather information, road information, SNS (Social Networking Service) information, and the like. The map information is stored in the external information storage unit 19 when transmitted from a map information distribution server to the center device 2. The weather information includes various information on weather such as weather itself, precipitation, snowfall, wind speeds, and wind directions, and is stored in the external information storage unit 19 when transmitted from a weather information distribution server to the center device 2. The road information includes various information about roads such as a road surface condition and a traffic condition, and is stored in the external information storage unit 19 when transmitted from a road information distribution server to the center device 2. SNS information is information provided by an unspecified number of users through applications such as Facebook, Twitter (Registered Trademark), Instagram, etc. The SNS information provided from an unspecified number of users is collected by, for example, an organization that provides SNS services and the collected SNS information is stored in the external information storage unit 19 when an operator inputs the collected SNS information into the center device 2.

The control unit 14 includes a microprocessor having a CPU (central processing unit), a ROM (read only memory), a RAM (random access memory), and the like. The controller executes a control program stored in a non-transitory tangible storage medium to perform various processes and controls operation of the center device 2. The control programs executed by the control unit 14 include a distribution control program. The control unit 14 includes a distribution control unit 14*a*, a vehicle information acquisition unit 14*b*, a vehicle information analysis unit 14*c*, an external information acquisition unit 14*d*, an external information analysis unit 14*e*, a normal operation determination unit 14*f*, a distribution target expansion unit 14*g*, and a grouping unit 14*h*.

The distribution control unit 14*a* controls distribution of the reprogramming data to vehicles. The vehicle information acquisition unit 14*b* acquires the vehicle information stored in the vehicle information storage unit 18. When the vehicle information is acquired by the vehicle information acquisition unit 14, the vehicle information analysis unit 14*c* analyzes the acquired vehicle information. The vehicle information is periodically transmitted from the vehicle master device 7 to the center device 2 to periodically update the vehicle information stored in the vehicle information storage unit 18. Thus, the vehicle information analysis unit 14*c* analyzes the updated vehicle information. The external information acquisition unit 14*d* acquires the external information stored in the external information storage unit 19. When the external information is acquired by the external information acquisition unit 14*d*, the external information analysis unit 14*e* analyzes the acquired external information. The external information is periodically transmitted from the external information distribution server to the center device 2 to periodically update the external information stored in the external information storage unit 19. Thus, the external information analysis unit 14*e* analyzes the updated external information.

When the vehicle information is analyzed by the vehicle information analysis unit 14*c* and the external information is analyzed by the external information analysis unit 14*e*, the normal operation determination unit 14*f* creates an algorithm for determining whether operation of the distributed reprogramming data on the vehicle is normal, and then determines whether the operation of the distributed reprogramming data on the vehicle is normal using the created algorithm.

When the reprogramming data is distributed to a vehicle and when the normal operation determination unit 14*f* determines that the operation of the distributed reprogramming data on the vehicle is normal, the distribution target expansion unit 14*g* expands the distribution target for the reprogramming data. The pattern where the distribution target expansion unit 14*g* expands the distribution target for the reprogramming data includes a pattern where a distribution destination for the reprogramming data is increased, a pattern where a distribution amount of the reprogramming data is increased, and a pattern where functionality and performance by the distributed reprogramming data is expanded (i.e., extended). That is, expanding the distribution target for the reprogramming data includes increasing the number of the distribution destinations for the reprogramming data, increasing the distribution amount of the reprogramming data, and expanding the functionality and performance by the distributed reprogramming data.

In a situation where a function or performance of the reprogramming data is extended, when on/off of the function or performance is instructed from an outside, and if the function or performance can be turned on or off, the distribution control unit 14*a* distributes a command for turning on the function or performance of the distributed reprogramming data to the vehicle master device 7 during off of the function or performance of the distributed reprogramming data. Then, the function or performance of the distributed reprogramming data is turned on, and as a result the vehicle master device 7 expands the function or performance of the distributed reprogramming data.

The distribution target expansion unit 14*g* determines whether the vehicle is in a travelling state, and expands the distribution targets for the reprogramming data according to the determination result. That is, if the distribution control unit 14*a* expands the distribution targets for the reprogramming data that would not affect travelling of the vehicle, travelling of the vehicle would not be affected even if the distribution targets of the reprogramming data is expanded while the vehicle is traveling. However, if the distribution targets for the reprogramming data that would affect travelling of the vehicle is expanded while the vehicle is travelling, there is a concern that travelling of the vehicle would be affected. Therefore, expanding the distribution targets for the reprogramming data that would affect travelling of the vehicle is performed only when the vehicle is parked.

The grouping unit 14f divides vehicles as the distribution targets for the reprogramming data into a plurality of groups. The distribution target expansion unit 14g expands the distribution targets for the reprogramming data according to the groups defined by the grouping unit 14f.

Next, the process of the above configuration will be described with reference to FIGS. 2 to 18.

Figure 2:
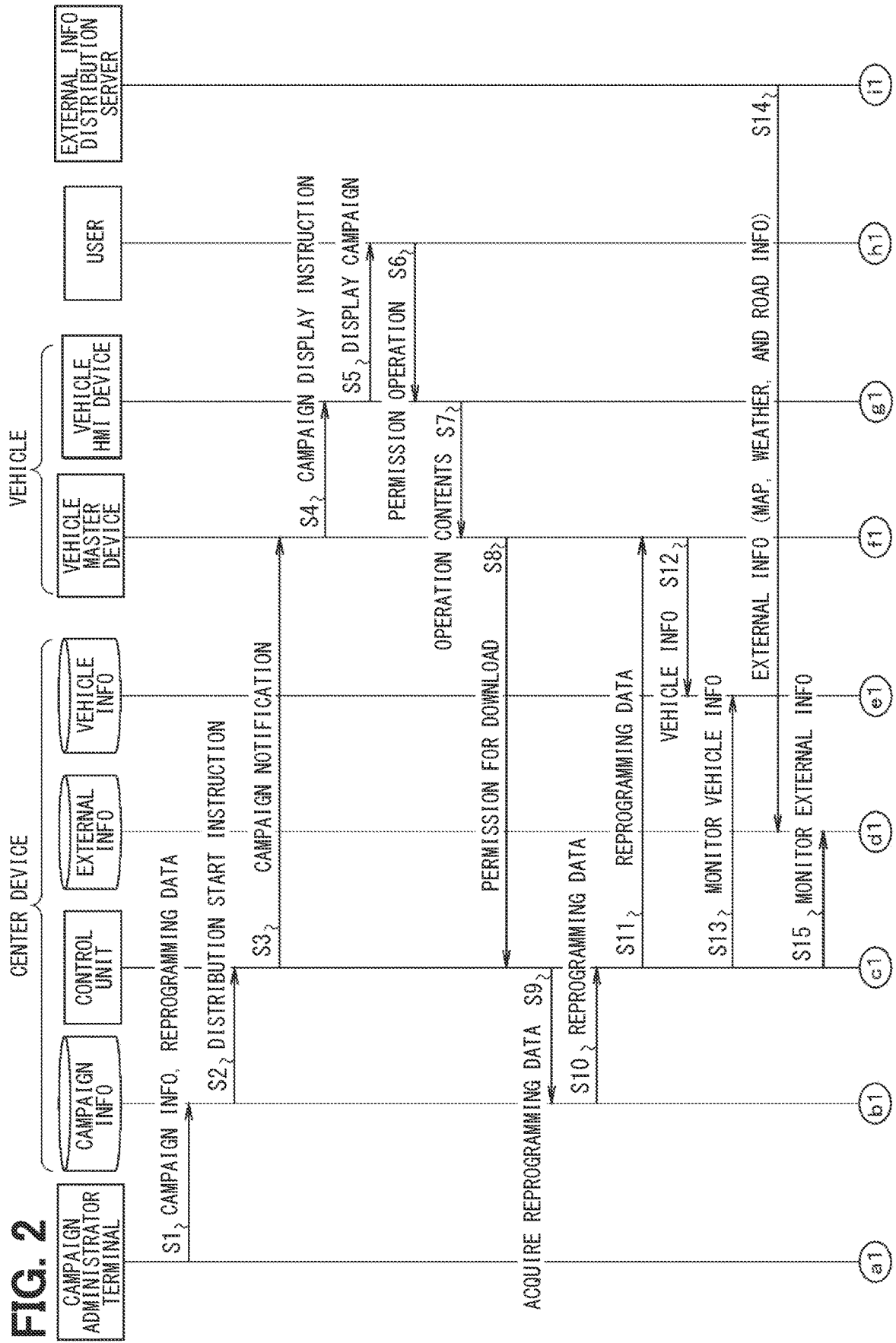
FIG. 2 is a diagram (No. 1) showing a sequence of processes.
Figure 3:
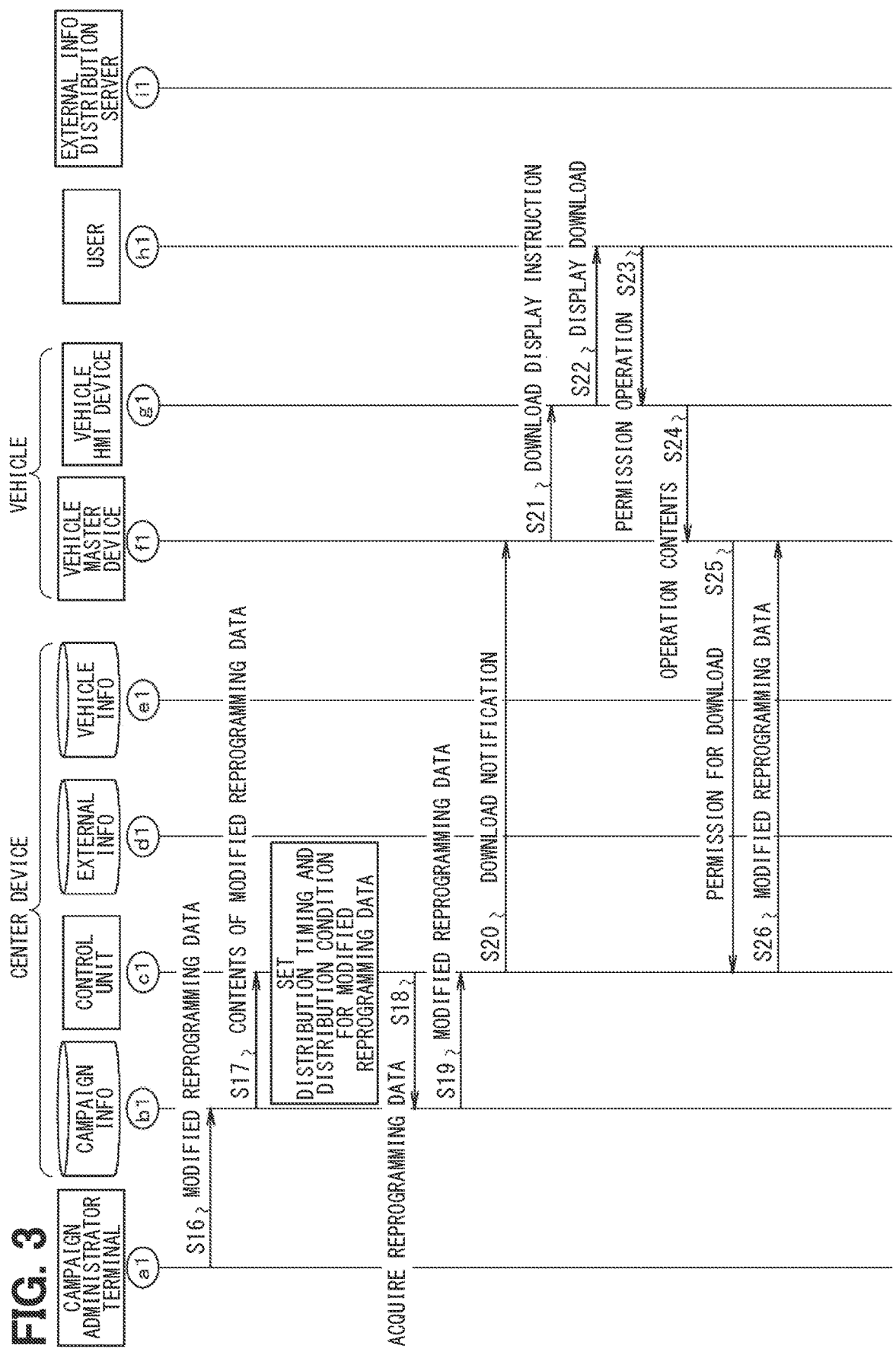
FIG. 3 is a diagram (No. 2) showing a sequence of processes.

As shown in FIGS. 2 and 3, when a distribution event condition of the reprogramming data is established, the campaign administrator terminal 3 transmits the campaign information and the reprogramming data to the center device 2 (S1). At the center device 2, when the control unit 14 receives the campaign information and the reprogramming data transmitted from the campaign manager terminal 3, the control unit 14 stores the received campaign information and the reprogramming data in the campaign information storage unit 16. When the control unit 14 determines a distribution start instruction (S2), the control unit 14 distributes the campaign notification to the vehicle master device 7 (S3).

When the vehicle master device 7 receives the campaign notification distributed from the center device 2, the vehicle master device 7 transmits a campaign display instruction to the vehicle HMI device 12 (S4), and causes the vehicle HMI device 12 to display the campaign notification screen image (S5). to prompt the user to choose whether to allow download of the reprogramming data. When the user selects to allow the start of downloading the reprogramming data, the vehicle HMI device 12 transmits its operation by the user to the vehicle master device 7 (S7). When the vehicle master device 7 receives the user's operation from the vehicle HMI device 12, the vehicle master device 7 transmits a download permission instruction to the center device 2 (S8).

At the center device 2, when the download permission instruction transmitted from the vehicle master device 7 is received, the control unit 14 acquires the reprogramming data from the campaign information storage unit 16 (S9, S10), and distributes the acquired reprogramming data to the vehicle master device 7 (S11).

After downloading the reprogramming data from the center device 2, the vehicle master device 7 periodically transmits the vehicle information to the center device 2 (S12). At the center device 2, when the vehicle information transmitted from the vehicle master device 7 is received, the control unit 14 stores the received vehicle information in the vehicle information storage unit 18. The control unit 14 periodically monitors the vehicle information stored in the vehicle information storage unit 18 (S13).

The external information distribution servers including the map information distribution server, the weather information distribution server, the road information distribution server, and the like periodically transmit the map information, the weather information, and the road information as the external information (S14). At the center device 2, when the external information transmitted from the vehicle master device 7 is received, the control unit 14 stores the received external information in the external information storage unit 19. The control unit 14 periodically monitors the external information stored in the external information storage unit 19 (S15).

After transmitting the campaign information and the reprogramming data to the center device, the campaign administrator terminal 3 creates a modified version of the reprogramming data that is the modified reprogramming data, and then waits until a distribution event condition for the modified reprograming data is established. When the distribution event condition for the modified reprogramming data is established, the campaign administrator terminal 3 transmits the modified reprogramming data to the center device 2 (S16).

At the center device 2, when the control unit 14 receives the modified reprogramming data transmitted from the campaign administrator terminal 3, the control unit 14 stores the received, modified reprogramming data in the campaign information storage unit 16 and acquires contents of the modified reprogramming data.

The control unit 14 periodically monitors the vehicle information and the external information, analyzes the vehicle information and the external information, sets a distribution timing and a distribution condition for the modified reprogramming data, and expands the distribution targets according to the distribution timing and the distribution condition that were set. When the set distribution timing for the modified reprogramming data comes, the control unit 14 acquires the modified reprogramming data from the campaign information storage unit 16 according to the set distribution condition (S18, S19), and distributes a download notification to the vehicle master device 7 (S20). The distribution condition is a condition on the distribution destination for the modified reprogramming data, the distribution amount of the modified reprogramming data, and the function and performance of the modified reprogramming data that has already been distributed.

When the vehicle master device 7 receives the download notification distributed from the center device 2, the vehicle master device 7 transmits a download instruction to the vehicle HMI device 12 (S21), and causes the vehicle HMI device 12 to display a download notification screen image (S22) to prompt the user to choose whether to allow download of the modified reprogramming data. When the user selects to allow the start of downloading the modified reprogramming data (S23), the vehicle HMI device 12 transmits this user's operation to the vehicle master device 7 (S24). When the vehicle master device 7 receives the user's operation from the vehicle HMI device 12, the vehicle master device 7 transmits a download permission instruction to the center device 2 (S25).

At the center device 2, when the download permission instruction transmitted from the vehicle master device 7 is received, the control unit 14 distributes the acquired modified reprogramming data to the vehicle master device 7 (S26). As the pattern where the distribution target expansion unit 14g expands distribution targets for the modified reprogramming data, the control unit 14 performs one of the pattern where the distribution destinations for the modified reprogramming data are increased, the pattern where a distribution amount of the modified reprogramming data is increased, and the pattern where functionality and performance by the modified reprogramming data which was distributed is extended. Hereinafter, each pattern will be described.

(1) Pattern to increase the distribution destinations of the modified reprogramming data As shown in FIG. 4, the control unit 14 analyzes, as the vehicle information and the external information, an average parking time during a time zone from 10 AM to 5 PM, a temperature change range, and a distance from the nearest dealer for each vehicle. The control unit 14 groups the vehicles according to the distances from the nearest dealer. As shown in FIG. 5, the control unit 14 categorizes vehicles A to C as group A, vehicles D to F as group B, and vehicles G to I as group C in order of distances from the nearest dealer.

As shown in FIG. 6, the control unit 14 sets the number of target vehicles for each of the groups, and creates a distribution plan to increase the distribution destinations for the modified reprogramming data according to the set number of the target vehicles. For group A, the control unit 14 sets, for example, the number of the target vehicles to 100, and sets the distribution timing of the modified reprogramming data to the 100 target vehicles on M1(month)/D1 (date). Similarly, for group B, the control unit 14 sets, for example, the number of the target vehicles to 900, sets the distribution timing of the modified reprogramming data to the 900 target vehicles on M2/D2, and sets group C, for example, the number of the target vehicles to 9000, and the distribution timing of the modified reprogramming data to the 9000 target vehicles on M3/D3. The order of the dates is M1/D1, M2/D2, and M3/D3 from the earliest date. It should be noted that M1, M2, and M3 are arbitrary natural numbers of "1" to "12", and D1, D2, and D3 are arbitrary natural numbers of "1" to "31".

Figure 7:
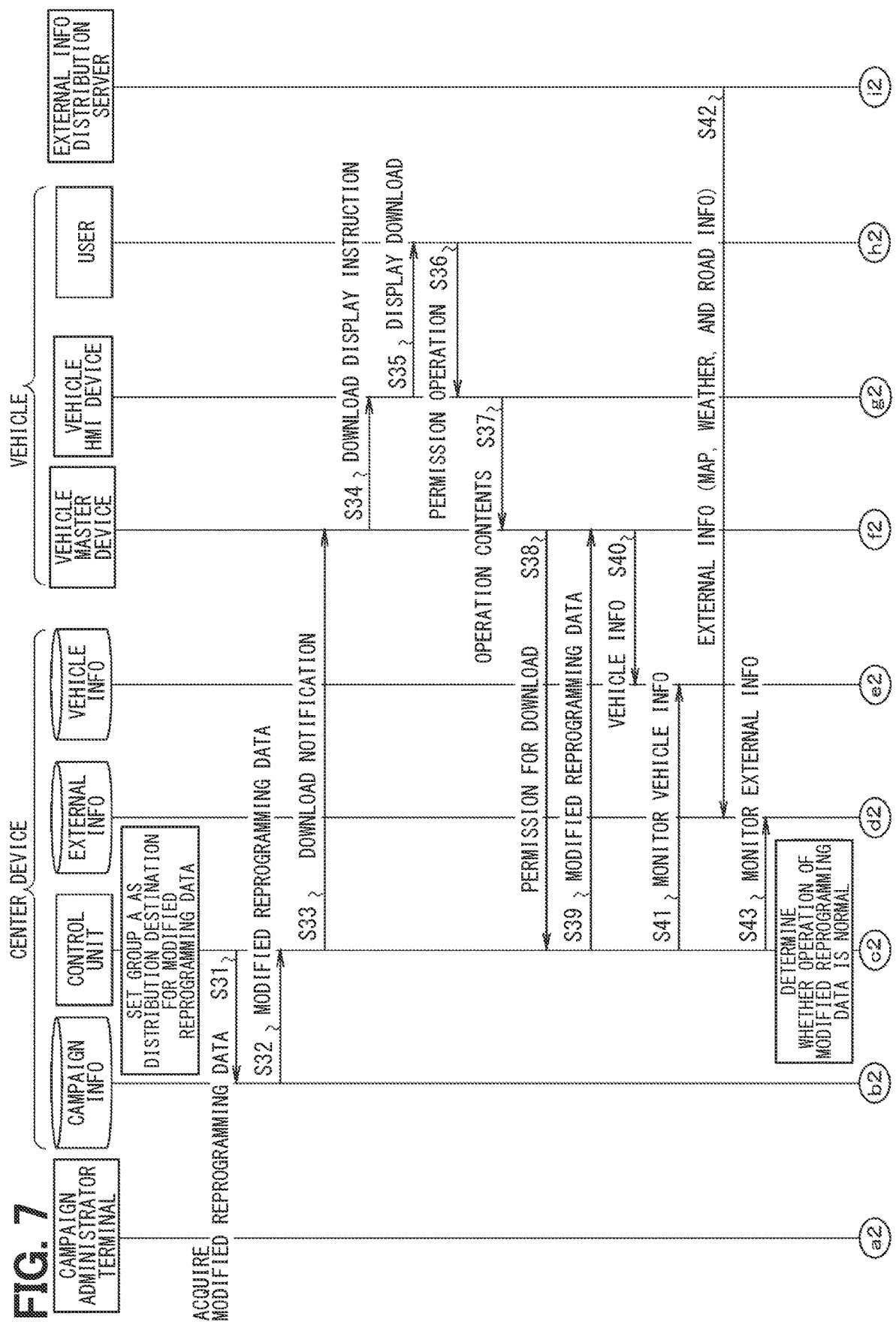
FIG. 7 is a diagram (No. 1) showing a flow of processes in a pattern for expanding the distribution target for the modified reprogramming data.
Figure 8:
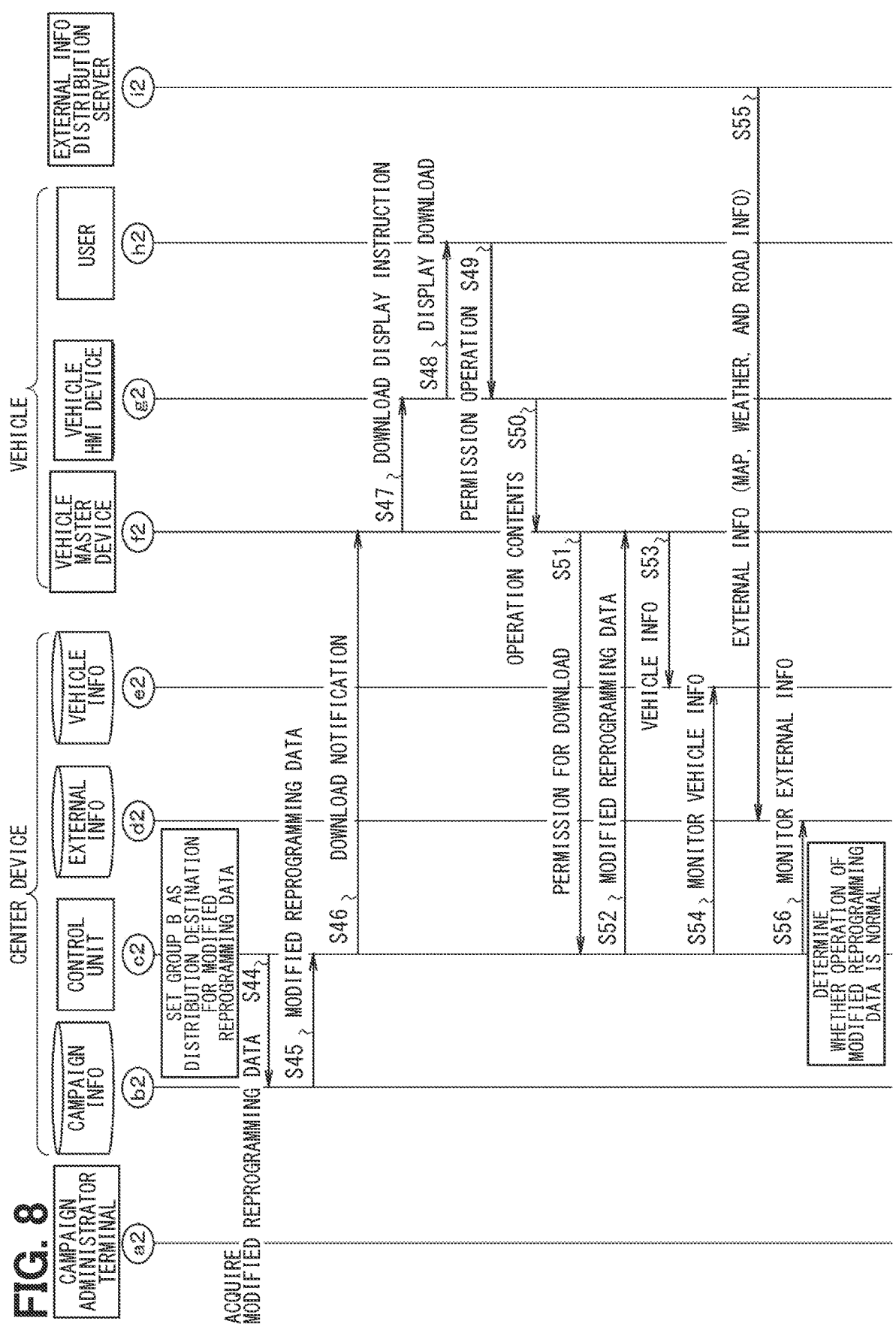
FIG. 8 is a diagram (No. 2) showing a flow of processes in a pattern for expanding the distribution target for the modified reprogramming data.

As shown in FIGS. 7 and 8, at the center device 2, when M1/D1 that was set as the distribution timing for group A comes, the control unit 14 sets group A as the distribution destination for the modified reprogramming data. The control unit 14 acquires the modified reprogramming data from the campaign information storage unit 16 (S31, S32), and distributes the download notification to the vehicle master devices 7 of the vehicles belonging to group A (S33).

When each of the vehicle master devices 7 of the vehicles belonging to group A receives the download notification distributed from the center device 2, the vehicle master device 7 transmits a download instruction to the vehicle HMI device 12 (S34), and causes the vehicle HMI device 12 to display a download notification screen image (S35) to prompt the user to choose whether to allow for download of the modified reprogramming data.

When the user selects to allow the start of downloading the modified reprogramming data (S36), the vehicle HMI device 12 transmits its operation by the use to the vehicle master devices 7 of the vehicles belonging to group A (S37). When each of the vehicle master devices 7 of the vehicles belonging to group A receives the user's operation from the vehicle HMI device 12, the vehicle master device 7 transmits a download permission instruction to the center device 2 (S38).

At the center device 2, when the download permission instructions transmitted from the vehicle master devices 7 of the vehicles belonging to group A are received, the control unit 14 distributes the acquired modified reprogramming data to the vehicle master devices 7 of the vehicles belonging to group A (S39). After that, the control unit 14 periodically monitors the vehicle information transmitted from the vehicle master devices 7 of the vehicles belonging to the group A (S40, 41), and periodically monitors the external information distributed from the external information distribution server including the map information distribution server, the weather information distribution server, and the road information distribution server (S42, 43). The control unit 14 creates the algorithm for determining whether the operation of the distributed, modified reprogramming data on the vehicle is normal from the analysis results of the vehicle information and the external information, and determines whether the operation of the modified reprogramming data that was distributed to each of the vehicles belonging to group A is normal.

When M2/D2 that was set for group B as the distribution timing comes, the control unit 14 determines whether the operation of the modified reprogramming data that was distributed to the vehicles belonging to group A is normal during the period from M1/D1 to M2/D2 (a normal operation determination step). When the control unit 14 determines that the operation of the modified reprogramming data distributed to the vehicles belonging to group A is normal, the control unit 14 sets group B as the distribution destination for the modified reprogramming data and performs the same processing to distribute the modified reprogramming data to the vehicle master devices 7 of the vehicles belonging to group B (S44 to S56, a distribution target expansion step).

Similarly, when M3/D3 that was set for group C as the distribution timing comes, the control unit 14 determines whether the operation of the modified reprogramming data that was distributed to the vehicles belonging to group B is normal during the period from M2/D2 to M3/D3 (the normal operation determination step). When the control unit 14 determines that the operation of the modified reprogramming data distributed to the vehicles belonging to group B is normal, the control unit 14 sets group C as the distribution destination of the modified reprogramming data and performs the same processing to distribute the modified reprogramming data to the vehicle master devices 7 of the vehicles belonging to group C (the distribution target expansion step).

In this way, the control unit 14 expands the distribution targets for the modified reprogramming data by increasing the distribution destinations for the modified reprogramming data step by step. If the operation of the modified reprogramming data distributed to the vehicles belonging to group A is not normal and a defect is detected in the modified reprogramming data, the control unit 14 does not distribute the modified reprogramming data to the vehicle master devices 7 of the vehicles belonging to group B. That is, the control unit 14 suppresses the damage that would be caused by the defect by not distributing the modified reprogramming data to the vehicle master devices 7 of the vehicles belonging to the group B. In addition, the control unit 14 takes necessary measures for the modified reprogramming data from which the defect is detected.

As illustrated in FIGS. 4 and 5, by grouping the vehicles according to the distances from the nearest dealer, even if a defect is detected in the modified reprogramming data, a person in charge of the dealer can immediately handle this defect. The grouping is not necessarily limited to grouping according to the distances from the nearest dealer, and may be grouped according to, for example, vehicle types, model years, grades, and the like. For example, when grouping is done according to the vehicle types, the modified reprogramming data may be distributed to vehicles categorized as vehicle type A, and then distributed to vehicles categorized as vehicle type B upon determining that the operation of the modified reprogramming data on the vehicles categorized as vehicle type A is normal. Further, when grouping is done according to the model years, the modified reprogramming data may be distributed to vehicles with relatively new model years first, and then distributed to vehicles with relatively old model years upon determining that the operation of the modified reprogramming data on the vehicles with the relatively new model years is normal. Further, when grouping is done according to the grades, the modified reprogramming data may be distributed to vehicles with relatively high grades first, and then distributed to vehicles with relatively low grades upon determining that the operation of the modified reprogramming data on the vehicles with the relatively high grades is normal.

(2) Pattern to increase the distribution amount of the modified reprogramming data As shown in FIG. 9, the control unit 14 divides the modified reprogramming data into logical units, and calculates data capacity for each of the divided logical units. The logical unit is a unit of data that is a constituent of the modified reprogramming data. As shown in FIG. 10, the control unit 14 creates a distribution plan that increases the distribution amount of the reprogramming data according to the calculated data capacity. The control unit 14 sets the distribution timing of the modified reprogramming data for logical unit A having a data capacity of 10 kB (kilobytes) on M1/D1. Similarly, the control unit 14 sets the distribution timing of the modified reprogramming data for logical unit B having a data capacity of 1 MB (megabytes) on M2/D2, and sets the distribution timing of the modified reprogramming data for logical unit C having a data capacity of 10 MB on M3/D3.

Figure 11:
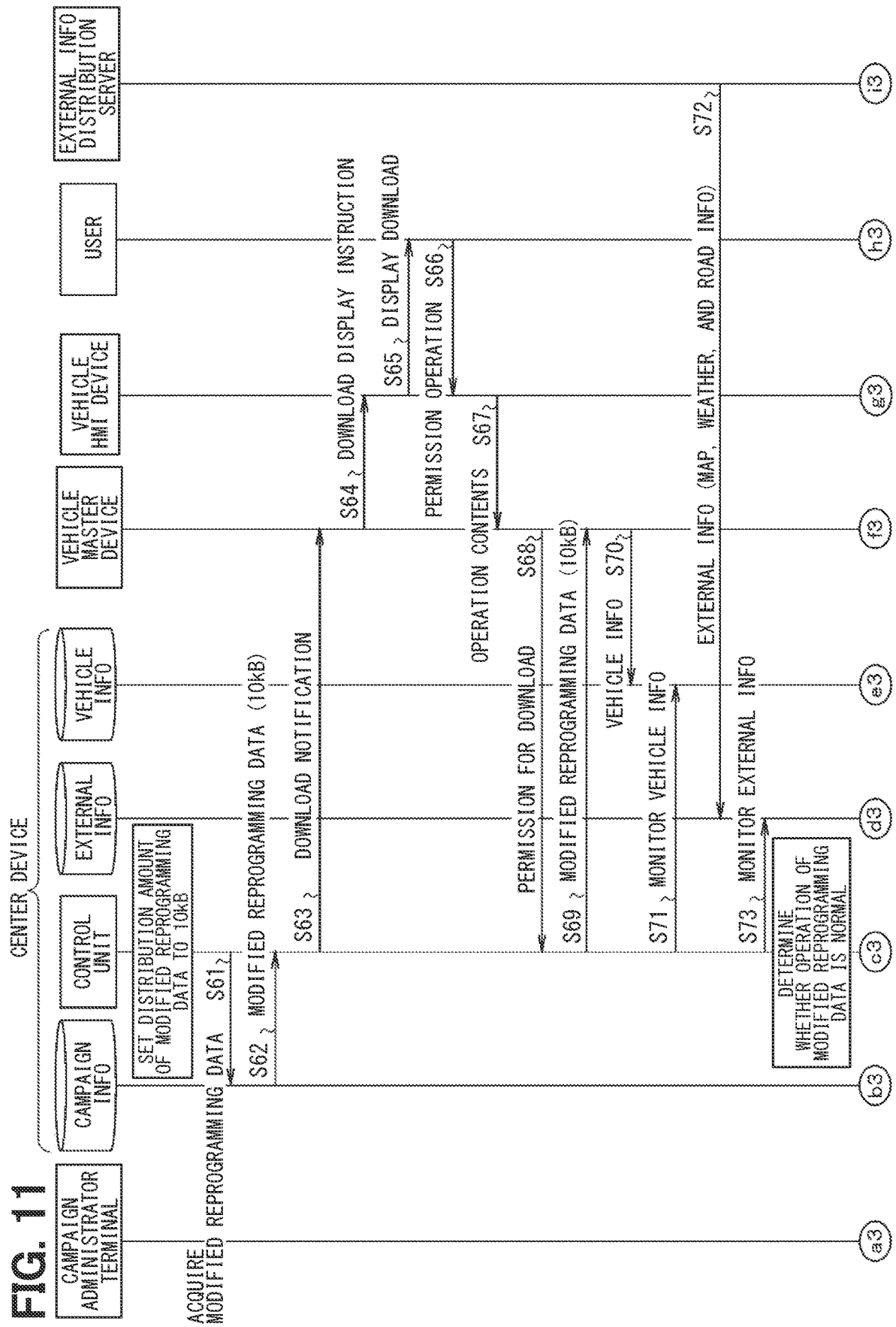
FIG. 11 is a diagram (No. 1) showing a flow of processes in a pattern for increasing the distribution amount of the modified reprogramming data.
Figure 12:
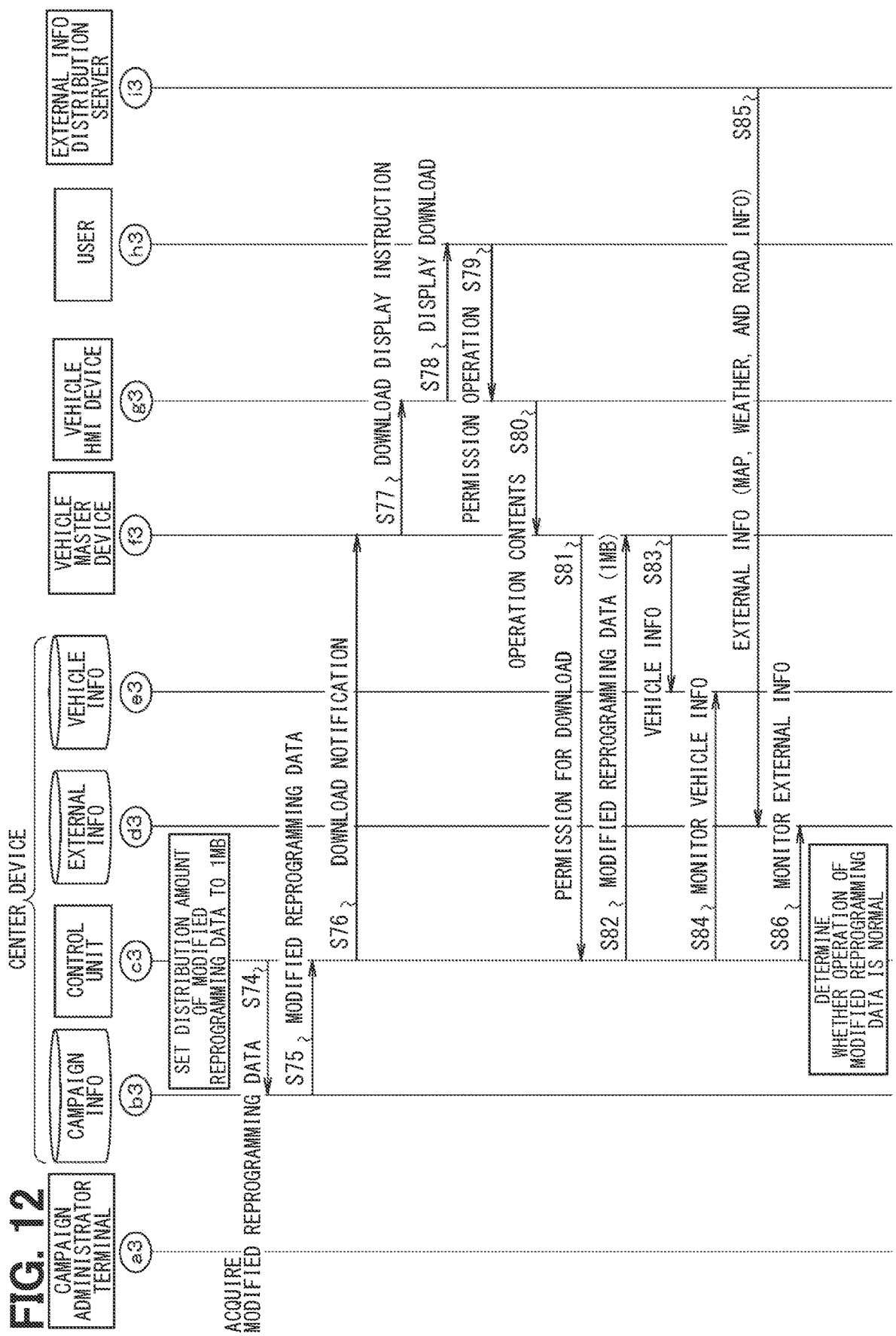
FIG. 12 is a diagram (No. 2) showing a flow of processes in a pattern for increasing the distribution amount of the modified reprogramming data.

As shown in FIGS. 11 and 12, at the center device 2, when M1/D1 that was set as the distribution timing for logical unit A comes, the control unit 14 sets the distribution amount of the modified reprogramming data to 10 kB of logical unit A. The control unit 14 acquires 10 kB of logical unit A among the modified reprogramming data from the campaign information storage unit 16 (S61, S62), and distributes the download notification regarding the acquired logical unit A to the vehicle master device 7 (S63).

When the vehicle master device 7 receives the download notification regarding logical unit A distributed from the center device 2, the vehicle master device 7 transmits a download instruction to the vehicle HMI device 12 (S64), and causes the vehicle HMI device 12 to display a download notification screen image (S64) to prompt the user to choose whether to allow download of logical unit A in the reprogramming data. When the user selects to allow the start of downloading logical unit A (S66), the vehicle HMI device 12 transmits its operation by the use to the vehicle master device 7 (S67). When the vehicle master device 7 receives the user's operation from the vehicle HMI device 12, the vehicle master device 7 transmits a download permission instruction to the center device 2 (S68).

At the center device 2, when the download permission instruction transmitted from the vehicle master device 7 is received, the control unit 14 distributes 10 kB of logical unit A within the modified reprogramming data to the vehicle master device 7 (S69). After that, the control unit 14 periodically monitors the vehicle information transmitted from the vehicle master device 7 (S70, 71), and periodically monitors the external information distributed from the external information distribution server including the map information distribution server, the weather information distribution server, and the road information distribution server (S72, 73). The control unit 14 creates the algorithm for determining whether the operation of logical unit A in the distributed, modified reprogramming data on the vehicle is normal from the analysis results of the vehicle information and the external information, and determines whether the operation of logical unit A in the modified reprogramming data that was distributed to the vehicle is normal.

When M2/D2 that was set for logical unit B as the distribution timing comes, the control unit 14 determines whether the operation of logical unit A in the modified reprogramming data that was distributed to the vehicle is normal during the period from M1/D1 to M2/D2 (the normal operation determination step). When the control unit 14 determines that the operation of logical unit A in the modified reprogramming data distributed to the vehicle is normal, the control unit 14 sets the distribution amount of the modified reprogramming data to 1 MB of logical unit B and performs the same processing to distribute 1 MB of logical unit B in the modified reprogramming data to the vehicle master device 7 (S74 to S86, the distribution target expansion step).

Similarly, when M3/D3 that was set for logical unit C as the distribution timing comes, the control unit 14 determines whether the operation of logical unit B in the modified reprogramming data that was distributed to the vehicle is normal during the period from M2/D2 to M3/D3 (the normal operation determination step). When the control unit 14 determines that the operation of logical unit B in the modified reprogramming data distributed to the vehicle is normal, the control unit 14 sets the distribution amount of the modified reprogramming data to 10 MB of logical unit C and performs the same processing to distribute 10 MB of logical unit C in the modified reprogramming data to the vehicle master device 7 (the distribution target expansion step).

In this way, the control unit 14 expands the distribution target for the modified reprogramming data by increasing the distribution amount of the modified reprogramming data step by step. If the operation of logical unit A in the modified reprogramming data distributed to the vehicle is not normal and a defect is detected in logical unit A in the modified reprogramming data, the control unit 14 does not distribute 1 MB of logical unit B in the modified reprogramming data to the vehicle master device 7 of the vehicle. That is, the control unit 14 suppresses the damage that would be caused by the defect by not distributing 1 MB of logical unit B in the modified reprogramming data to the vehicle master device 7 of the vehicle. In addition, the control unit 14 takes necessary measures for the modified reprogramming data from which the defect is detected.

(2) Pattern to expand a function or performance by the modified reprogramming data that was distributed As shown in FIG. 13, the control unit 14 sets an auto-braking function, an auto-steering function, and an auto-acceleration function as target functions of the distributed, modified reprogramming data to be turned on or off. As shown in FIG. 14, the control unit 14 creates a distribution plan for expanding functions or performance of the distributed reprogramming data by setting mode 1, mode 2, and mode 3. Mode 1 is a mode where the auto-braking function is on, the auto-steering function is off, and the auto-acceleration function is off. Mode 2 is a mode where the auto-braking function is on, the auto-steering function is on, and the auto-acceleration function is off. Mode 3 is a mode where the auto-braking function is on, the auto-steering function is on, and the auto-acceleration function is on. The control unit 14 sets a distribution timing for a setting change notification that indicates to change to mode 1 on M1/D1. Similarly, the control unit 14 sets the distribution timing for the setting change notification that indicates to change to mode 2 on M2/D2, and sets the distribution timing for the setting change notification that indicates to change to mode 3 on M3/D3.

Figure 15:
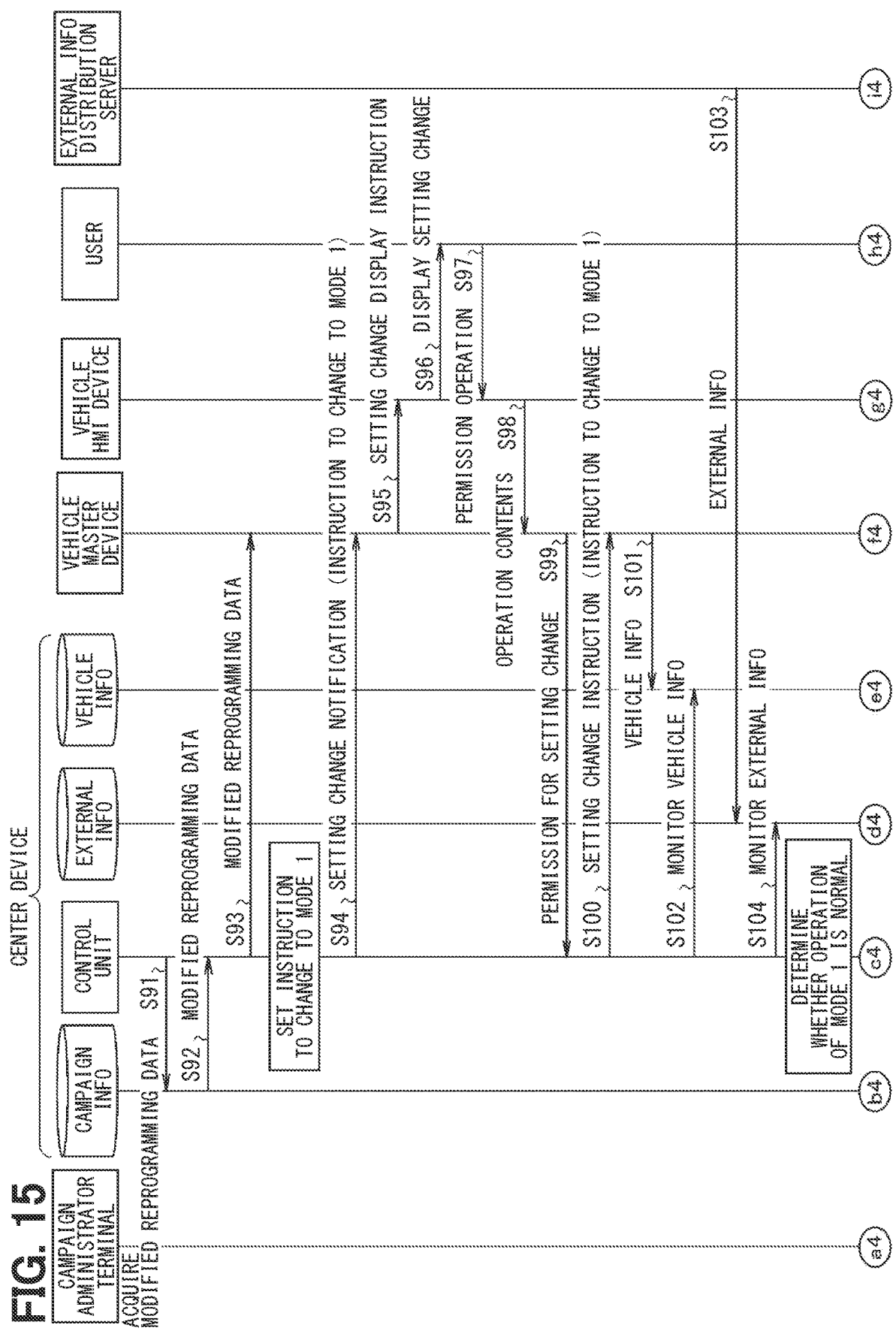
FIG. 15 is a diagram (No.1) showing a flow of processes in a pattern for expanding the functions and performance of the modified reprogramming data that was distributed.
Figure 16:
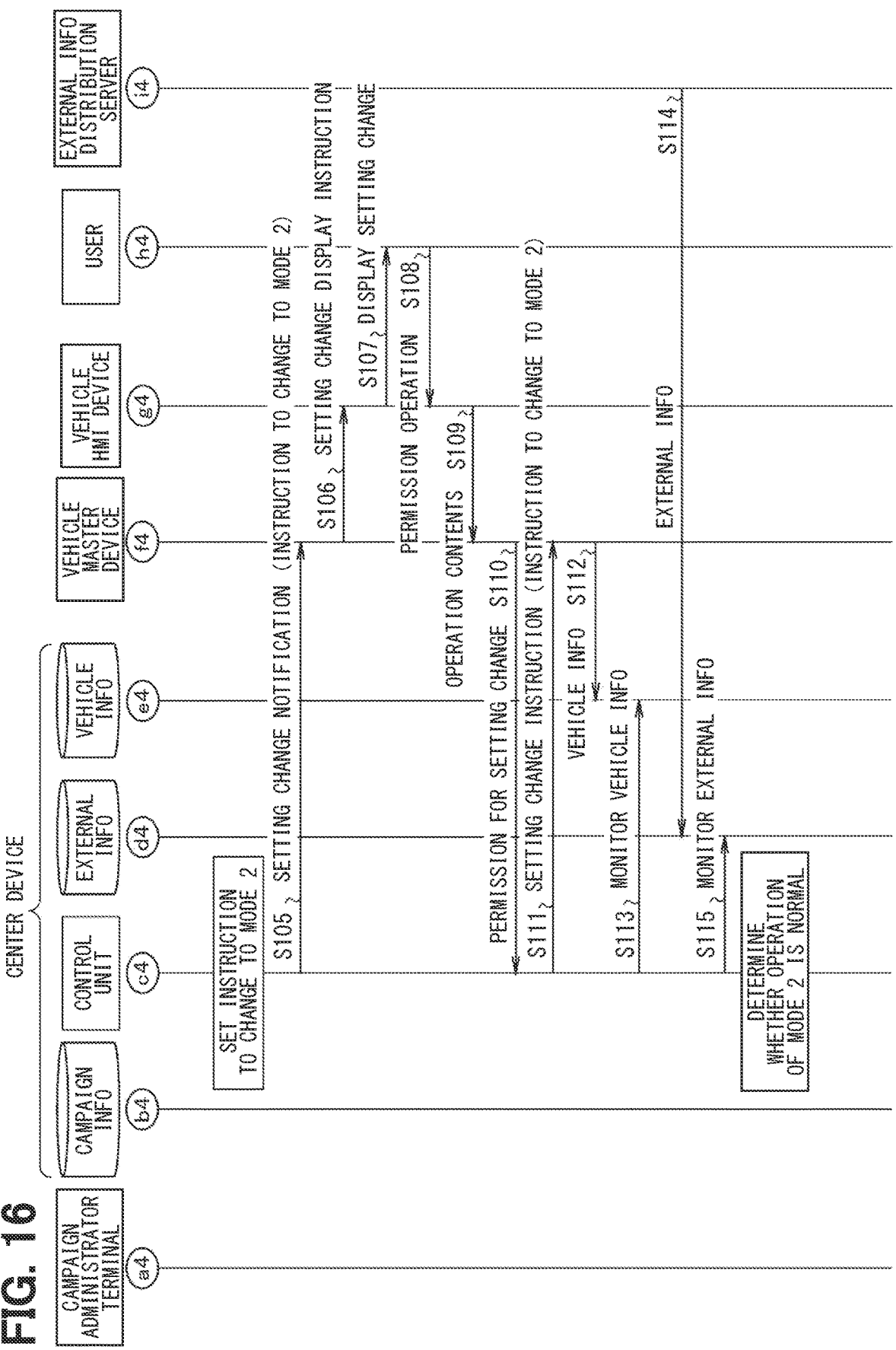
FIG. 16 is a diagram (No. 2) showing a flow of processes in a pattern for expanding the functions and performance of the modified reprogramming data that was distributed.

As shown in FIGS. 15 and 16, at the center device 2, the control unit 14 distributes the setting change notification that indicates to change to mode 1 to the vehicle master device 7 (S94) when M1/D1 that is a distribution timing for the setting change notification that indicates to change to mode 1 comes after distributing the modified reprogramming data to the vehicle master device 7 (S91 to S93).

Upon receiving the setting change notification distributed from the center device 2, the vehicle master device 7 transmits a setting change display instruction to the vehicle HMI device 12 (S95), causes the vehicle HMI device 12 to display a setting change notification screen image (S96), and prompts the user to select whether to allow a setting change for the distributed reprogramming data. When the user selects to allow the setting change (S97), the vehicle HMI device 12 transmits its operation by the user to the vehicle master device 7 (S98). When the vehicle master device 7 receives the user's operation from the vehicle HMI device 12, the vehicle master device 7 transmits a setting change permission instruction to the center device 2 (S99).

At the center device 2, when the setting change permission instruction transmitted from the vehicle master device 7 is received, the control unit 14 distributes a setting change instruction indicating to change to mode 1 to the vehicle master device 7 (S100). When the vehicle master device 7 receives the setting change instruction distributed from the center device 2, the vehicle master device 7 turns on or off the auto-braking function, the auto-steering function, and the auto-acceleration function according to the received setting change instruction. That is, the vehicle master device 7 transmits a turning-on instruction for the auto-braking function to the brake ECU to turn on the auto-braking function of the brake ECU, transmits a turning-off instruction for the auto-steering function to the autonomous driving ECU to turn off the auto-steering function of the autonomous driving ECU, and transmits a turning-off instruction for the auto-acceleration function to the accelerator ECU to turn off the auto-acceleration function of the accelerator ECU. After that, the control unit 14 periodically monitors the vehicle information transmitted from the vehicle master device 7 (S101, 102), and distributes the external information distributed from the external information distribution server including the map information distribution server, the weather information distribution server, and the road information distribution server (S103, 104). The control unit 14 creates an algorithm for determining whether the operation of mode 1 on the vehicle (i.e., the operation of the auto-braking function on the vehicle) is normal from the analysis results of the vehicle information and the external information, and determines whether the operation of the auto-braking on the vehicle is normal using the created algorithm.

When M2/D2 that is a distribution timing for the setting change notification indicating to change to mode 2 comes, the control unit 14 determines whether the operation of the auto-braking function on the vehicle is normal during the period from M1/D1 to M2/D2 (the normal operation determination step). When the control unit 14 determines that the operation of the auto-braking function on the vehicle is normal, the control unit 14 distributes the setting change notification indicating to change to mode 2 to the vehicle master device 7 (S105 to S115, the distribution target expansion step). In this case, when receiving the setting change notification distributed from the center device 2, the vehicle master device 7 transmits, according to the received notification, a turning-on instruction for the auto-braking function to the brake ECU to keep the on-state of the auto-braking function of the brake ECU, transmits a turning-on instruction for the auto-steering function to the autonomous driving ECU to change the auto-steering function of the autonomous driving ECU from the off-state to the on-state, and transmits a turning-off instruction for the auto-acceleration function to the accelerator ECU to keep the off-state of the auto-acceleration function of the accelerator ECU.

Similarly, when M3/D3 that is a distribution timing for the setting change notification indicating to change to mode 3 comes, the control unit 14 determines whether the operation of the auto-braking function and the auto-steering function on the vehicle is normal during the period from M2/D2 to M3/D3 (the normal operation determination step). When the control unit 14 determines that the operation of the auto-braking function and the auto-steering function on the vehicle is normal, the control unit 14 distributes the setting change notification indicating to change to mode 3 to the vehicle master device 7 (the distribution target expansion step). In this case, when receiving the setting change notification distributed from the center device 2, the vehicle master device 7 transmits, according to the received notification, a turning-on instruction for the auto-braking function to the brake ECU to keep the on-state of the auto-braking function of the brake ECU, transmits a turning-on instruction for the auto-steering function to the autonomous driving ECU to keep the on-state of the auto-steering function of the autonomous driving ECU, and transmits a turning-on instruction for the auto-acceleration function to the accelerator ECU to change the auto-acceleration function of the accelerator ECU from the off-state to the on-state.

In this way, the control unit 14 expands the distribution target for the modified reprogramming data by expanding functions or performance by the distributed, modified reprogramming data step by step. If the operation of mode 1 on the vehicle is not normal after the control unit 14 distributes the setting change notification indicating to change to mode 1 to the vehicle and a defect is detected in the modified reprogramming data, the control unit 14 does not distribute the setting change notification indicating to change to mode 2 to the vehicle master device 7 of the vehicle. That is, the control unit 14 suppresses the damage that would be caused by the defect by not distributing the setting change notification indicating to change to mode 2 to the vehicle master device 7 of the vehicle. In addition, the control unit 14 takes necessary measures for the modified reprogramming data from which the defect is detected. In the above, the auto-braking function of the brake ECU, the auto-steering function of the autonomous driving ECU, and the auto-acceleration function of the accelerator ECU are turned on step by step. However, other functions of another ECU may be turned on.

Figure 17:
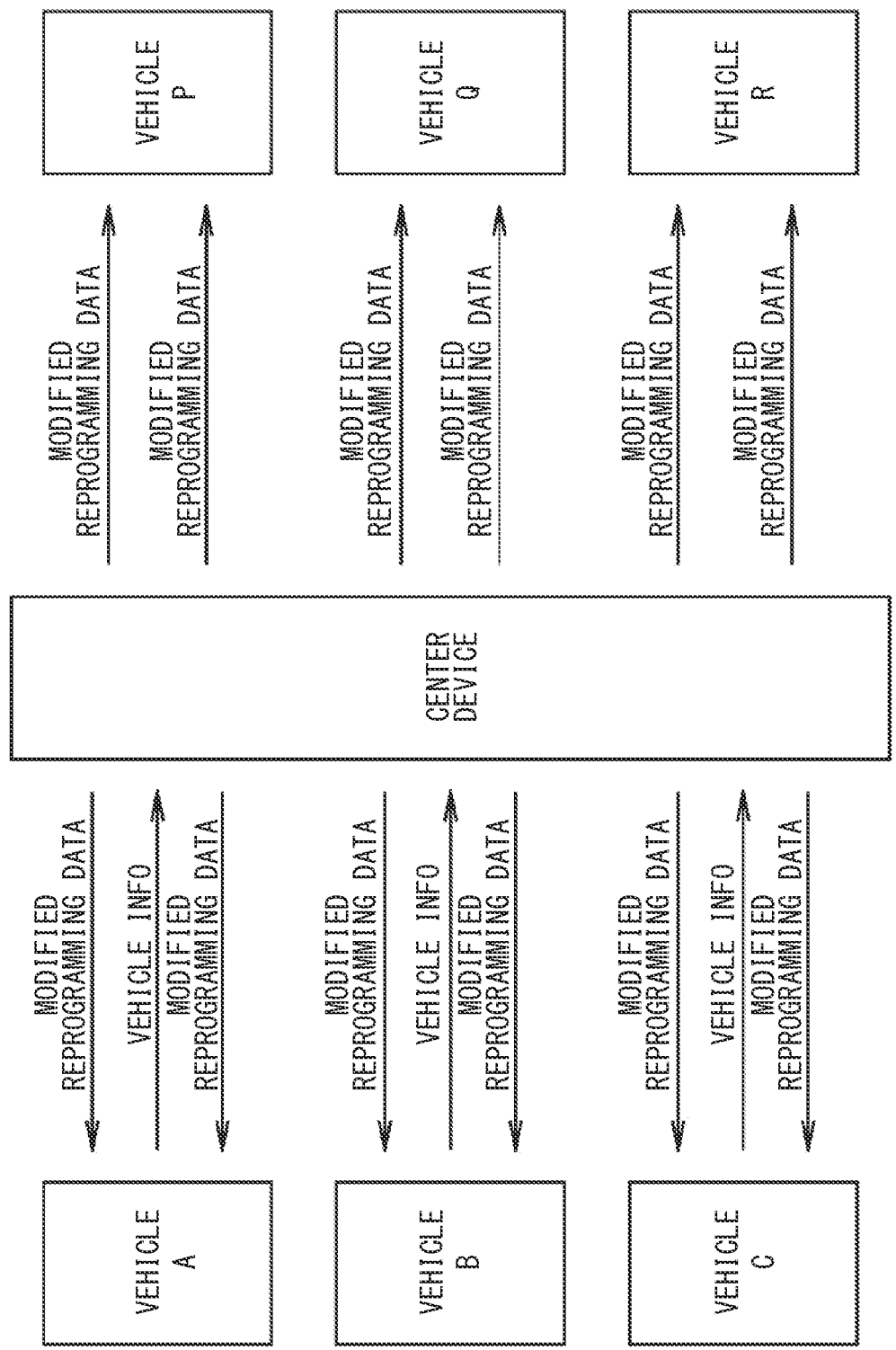
FIG. 17 is a diagram showing distribution destinations for the modified reprogramming data.

Further, in the center device 2, the modified reprogramming data or the setting change instruction is distributed to each of the vehicle master devices 7 of the vehicles that have transmitted the vehicle information. However, the data and the instruction may be distributed to the vehicle master devices 7 of the vehicles that have not transmitted the vehicle information. As shown in FIG. 17, at the center device 2, when expanding the distribution destination for the modified reprogramming data or the distribution amount of the modified reprogramming data, the control unit 14 distributes the modified reprogramming data with the same data structure to the vehicles A to C and the vehicles P to R, and then receives the vehicle information from the vehicles A to C. However, even if the center device 2 does not receive the vehicle information from the vehicles P to R for some reason, the control unit 14 may transmit the modified reprogramming data to the vehicles P to R in addition to the vehicles A to C.

Figure 18:
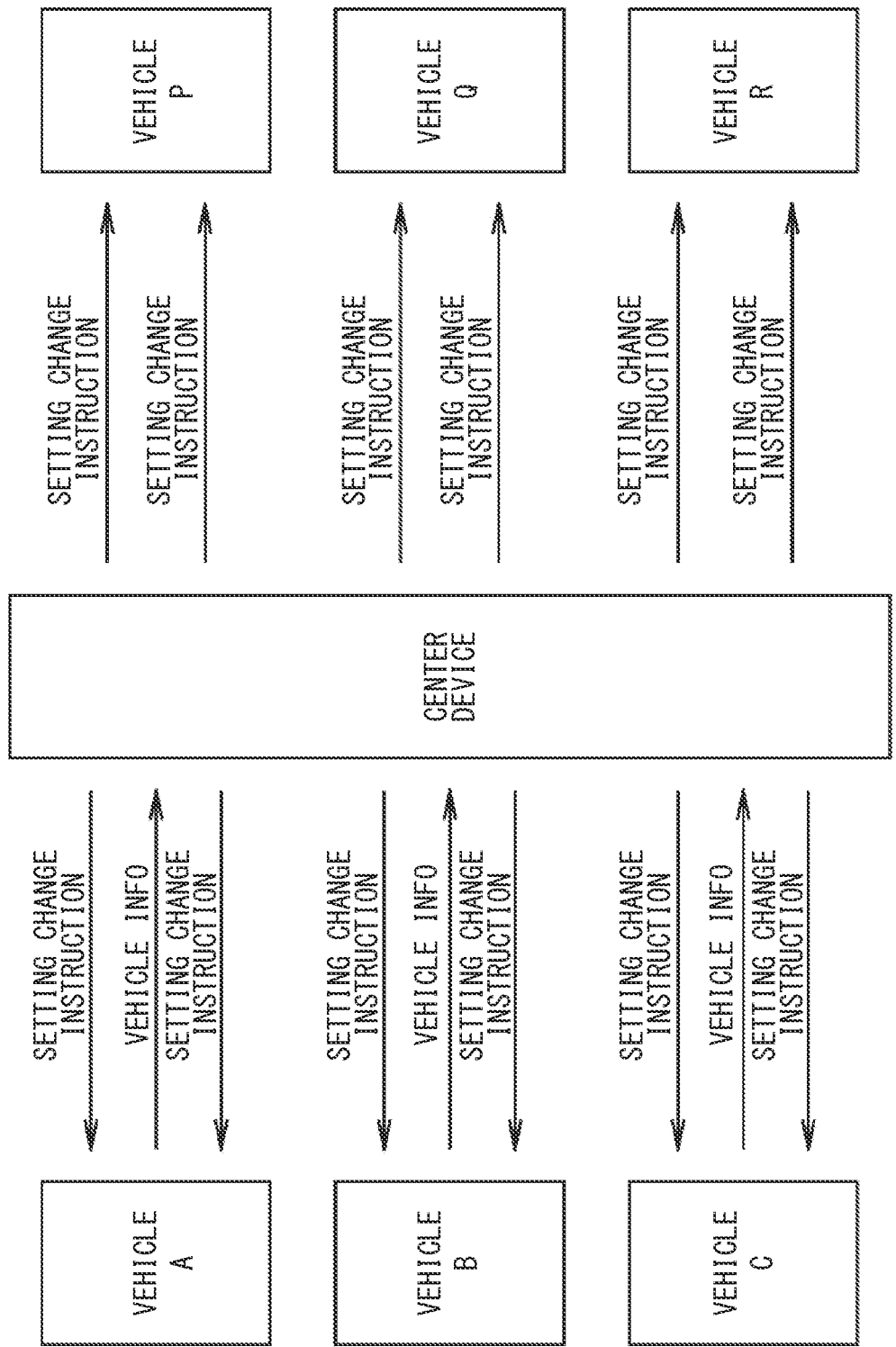
FIG. 18 is a diagram showing the distribution destinations for setting change instructions.

As shown in FIG. 18, at the center device 2, when expanding functions or performance of the distributed, modified reprogramming data, the control unit 14 distributes the modified reprogramming data with the same data structure to the vehicles A to C and the vehicles P to R, and then receives the vehicle information from the vehicles A to C. However, even if the center device 2 does not receive the vehicle information from the vehicles P to R for some reason, the control unit 14 may transmit the setting change instruction to the vehicles P to R in addition to the vehicles A to C.

As described above, the present embodiment may provide the following technical advantages. When the center device 2 distributes the modified reprogramming data to a vehicle and when the center device 2 determines that the operation of the distributed, modified reprogramming data on the vehicle is normal, the center device 2 expands the distribution target for the modified reprogramming data. By expanding the distribution target for the modified reprogramming data after confirming that the operation of the distributed, modified reprogramming data on the vehicle is normal, the range of influence associated with the distributed data can be appropriately narrowed.

At the center device 2, the control unit 14 expands the distribution target for the modified reprogramming data by increasing the number of the distribution destinations for the modified reprogramming data. After confirming that the operation of the distributed, modified reprogramming data on the vehicle is normal, the distribution destinations for the modified reprogramming data can be increased.

At the center device 2, the control unit 14 expands the distribution target for the modified reprogramming data by increasing the distribution amount of the modified reprogramming data. After confirming that the operation of the distributed, modified reprogramming data on the vehicle is normal, the distribution amount of the modified reprogramming data can be increased.

At the center device 2, the distribution target for the modified reprogramming data is expanded by controlling the vehicle master device 7 to expand functions or performance of the distributed, modified reprogramming data. After confirming that the operation of the distributed, modified reprogramming data on the vehicle is normal, functions or performance of the distributed, modified reprogramming data can be extended.

At the center device 2, by distributing a command to the vehicle that indicates to expand functions or performance of the distributed, modified reprogramming data, the vehicle master device 7 is controlled to expand functions or performance of the distributed, modified reprogramming data. In a configuration where the modified reprogramming data with expanded functions or performance is distributed, a distribution amount of the data would increase, data communication time would increase, and the expansion of the functions or performance would not be executed quickly. However, according to the present embodiment, the data transmission amount from the center device 2 to the vehicle can be reduced, data communication time can be shortened, and the expansion of the functions or performance can be executed quickly by distributing the command (not the data itself) to the vehicle.

The distribution targets for data are divided into groups, and the data distribution targets are expanded according to the groups. Thus, the distribution targets for the modified reprogramming data can be expanded step by step for each group unit.

At the center device 2, the vehicle information is acquired from the vehicle and is analyzed, and the analysis result is used to determine whether the operation of the distributed, modified reprogramming data on the vehicle is normal. By acquiring and analyzing the vehicle information, it is possible to determine whether the operation of the distributed, modified reprogramming data on the vehicle is normal based on an actual vehicle operation.

At the center device 2, the external information such as map information, weather information, and road information is acquired and is analyzed, and the analysis result is used to determine whether the operation of the distributed, modified reprogramming data on the vehicle is normal. By acquiring and analyzing the map information, the weather information, the road information, etc. as the external information, it is possible to monitor the operation of the distributed, modified reprogramming data on the vehicle in association with the external information.

Although the present disclosure has been described in accordance with the examples, it is understood that the present disclosure is not limited to such examples or structures. The present disclosure encompasses various modifications and variations within the scope of equivalents. Additionally, various combinations and configurations, as well as other combinations and configurations including more, less, or only a single element, are within the scope and spirit of the present disclosure.

In the above-described embodiment, although the distribution target for the modified reprogramming data is expanded, the distribution target for non-modified reprogramming data, that is, a first reprogramming data to be distributed to vehicles may be expanded. The data distributed from the center device 2 to the vehicle is not necessarily limited to the reprogramming data for updating an application program of the ECU, and may be map data or the like.

In the above-description, a function is turned on as extension (expansion) of a function or performance of the distributed, modified reprogramming data. Alternatively, a threshold value as a criterion for enabling a function may be changed, or the performance by the data may be enhanced.

The pattern where the distribution destinations for the modified reprogramming data is increased, the pattern where a distribution amount of the modified reprogramming data is increased, and the pattern where functionality and performance of the distributed, modified reprogramming data is extended can be combined. For example, the function and performance of the distributed, modified reprogramming data may be expanded step by step while the amount of the modified reprogramming data is increased step by step.

The control units and methods described in the present disclosure may be implemented by a special purpose computer provided by configuring a memory and a processor programmed to execute one or more functions embodied by a computer program. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer program may also be stored on a computer readable non-transitory tangible recording medium as instructions to be executed by a computer.

The invention claimed is:

1. A center device, comprising:
a distribution control unit that is configured to:
control distribution of data to a first vehicle via a public communication network, the first vehicle including an electronic control unit which is a target for a program update and a vehicle master device configured to distribute, to the electronic control unit, data for the program update, the electronic control unit being capable of performing functions or performances based on the distributed data at the first vehicle; and distribute, to the vehicle master device, a first command for controlling the vehicle master device to enable at least one function or one performance of the functions or performances of the distributed data;

a normal operation determination unit that is configured to determine whether the electronic control unit normally performed the at least one function or one performance of the functions or performances of the distributed data based on information received from the first vehicle; and a distribution target expansion unit that, in response to determining that the electronic control unit normally performed the at least one function or one performance of the functions or performances of the distributed data, is configured to distribute, to the vehicle master device, a second command for controlling the vehicle master device to enable remaining functions or performances of the functions or performances of the distributed data, wherein the distribution target expansion unit is further configured to:

not distribute the second command to the vehicle master device in response to the normal operation determination unit determining that the electronic control unit did not normally perform the at least one function or one performance of the functions or performances of the distributed data.

2. A center device, comprising:

at least one processor; and at least one memory storing computer program code, wherein the computer program code, when executed by the at least one processor, causes the at least one processor to:

distribute data to a target vehicle via a public communication network, the data being used for program update for an electronic control unit mounted in the target vehicle that is configured to perform at least a first function and a second function based on the distributed data;

transmit a first command to the target vehicle for instructing the electronic control unit to perform the first function based on the distributed data;

determine whether the electronic control unit normally performed the first function based on the distributed data;

transmit a second command to the target vehicle for instructing the electronic control unit to perform the second function with the distributed data in response to determining that the electronic control unit normally performed the first function; and not transmit the second command to the target vehicle in response to determining that the electronic control unit did not normally perform the first function.

3. A center device, comprising:

a distribution control unit that is configured to control distribution of data to a first vehicle;

a normal operation determination unit that is configured to determine whether operation of distributed data on the first vehicle is normal;

a distribution target expansion unit that is configured to expand a distribution target for the data when the normal operation determination unit determines that operation of the distributed data on the first vehicle is normal after the data was distributed to the first vehicle via a public communication network; and a grouping unit that divides the distribution target for the data into groups, wherein the distribution target expansion unit is further configured to expand the distribution target for the data according to the groups formed by the grouping unit, the distribution target for the data are a plurality of vehicles, and the grouping unit is further configured to divide the plurality of vehicles into the groups in accordance with a distance of each of the plurality of vehicles to a nearest dealer.

* * * * *